Figure 1:
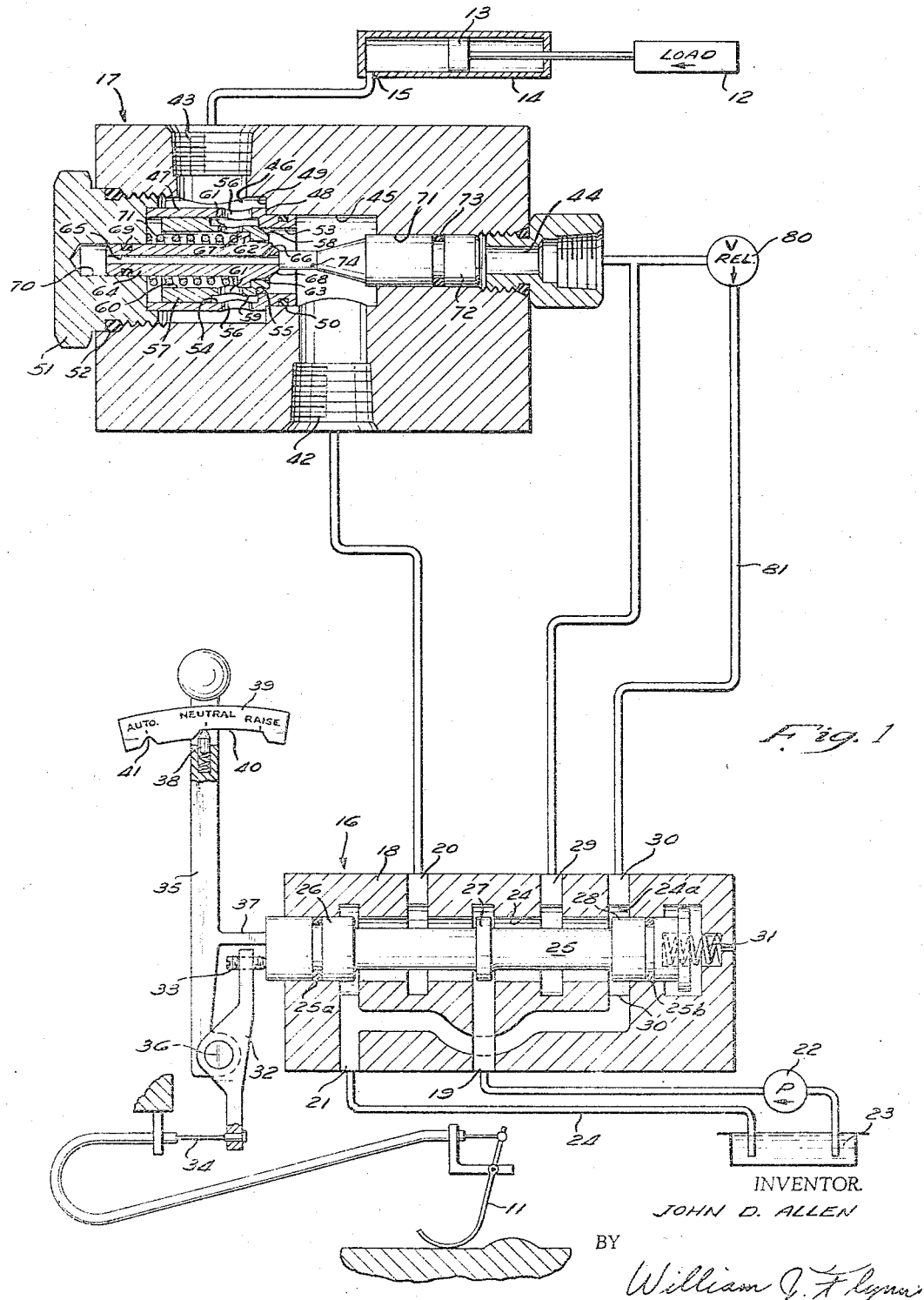

INVENTOR.
JOHN D. ALLEN
BY William J. F. Flynn
ATTORNEY

United States Patent Office 3,309,852
Patented Mar. 21, 1967

3,309,852
HYDRAULIC SYSTEM AND VALVE ARRANGEMENT THEREIN
John D. Allen, South Euclid, Ohio, assignor to Fawick Corporation, a corporation of Michigan
Filed Jan. 20, 1964, Ser. No. 339,009
5 Claims. (Cl. 56—208)

This invention relates to a hydraulic system, and to a valve arrangement therein, for controlling the operation of a hydraulic motor either automatically or manually.

An important practical application of the present invention is for controlling the height of the cutting head on a combine or other farm machine. To this end it has been proposed heretofore to provide ground-engaging feelers adjacent the cutting head which detect any substantial variations in the contour of the ground and operate a hydraulic system for raising or lowering the cutting head so as to maintain it at a predetermined clearance above the ground. The present invention is directed to a novel and improved hydraulic system, and to a novel and improved valve arrangement therein, which may be advantageously used in apparatus of this general type, as well as for other purpose.

It is an object of this invention to provide a novel and improved hydraulic system for operating a load.

It is also an object of this invention to provide a novel and improved valve arrangement for such a system.

Another object of this invention is to provide such a hydraulic system which avoids excessive heating and which requires less power for its operation, as well as being simpler and less expensive than previous systems for the same purpose.

Another object of this invention is to provide a novel valve arrangement which enables these improvements in the operation of the system.

Further objects and advantages of this invention will be apparent from the following detailed description of certain presently-preferred embodiments thereof, which are illustrated schematically in the accompanying drawings.

Figure 2:
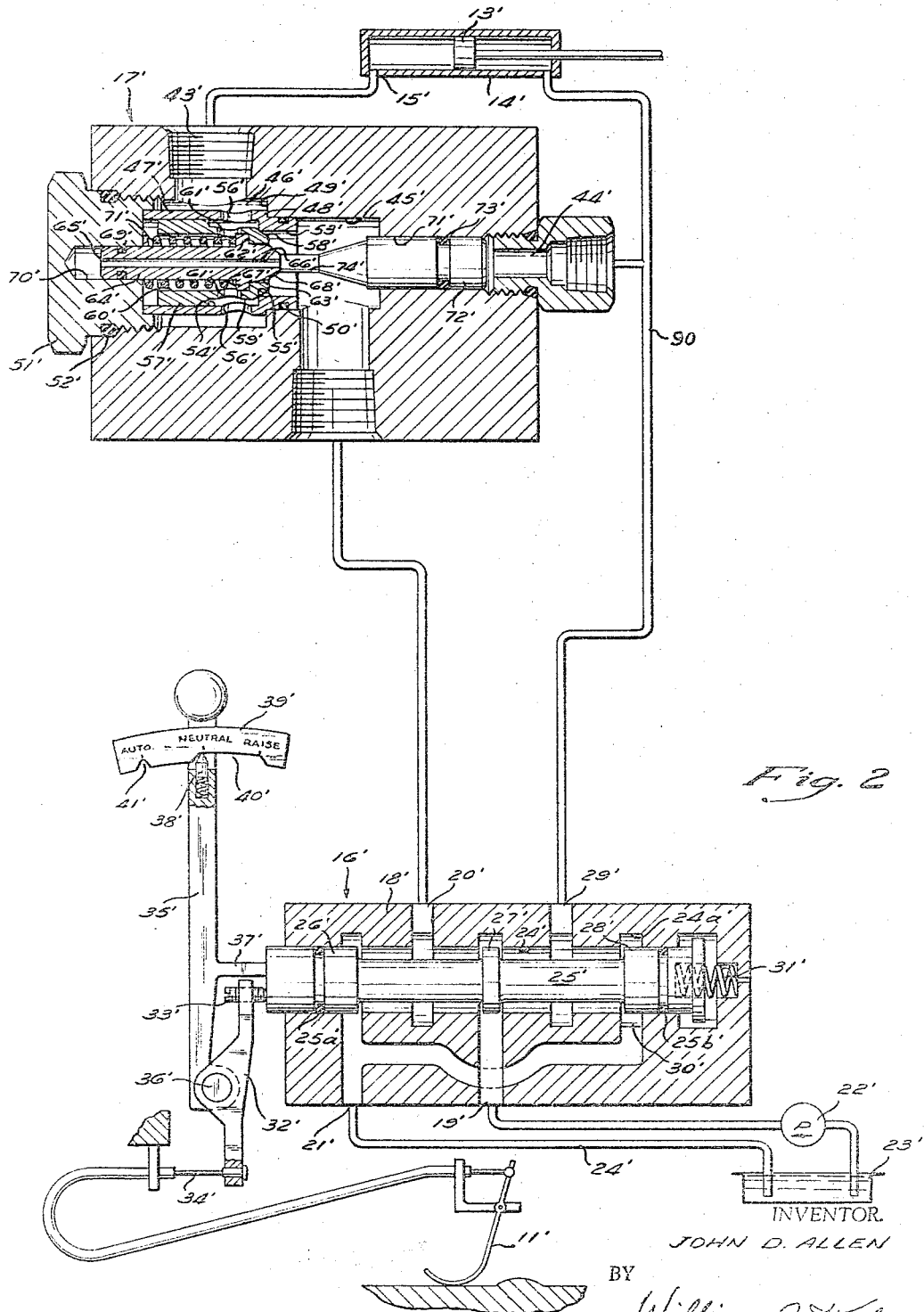

In the drawings:

FIGURE 1 is a schematic diagram showing a system according to the present invention for controlling a single-acting cylinder; and FIGURE 2 is a similar diagram of such a system for controlling a double-acting cylinder.

Referring first to FIG. 1, the hydraulic system shown therein is connected for operation by ground-engaging feelers 11, which are mounted in close proximity to the cutting head on a combine or the like. As the combine moves over the ground these feelers engage any bumps or depressions in the ground and operate the hydraulic system to maintain the cutting head at a predetermined clearance above the ground.

The weight of the cutting head itself is the "load" on the hydraulic system, and this load is indicated schematically at 12 in the drawing. This load is coupled to a hydraulic motor, consisting of a piston 13 and cylinder 14. The load tends to move piston 13 to the left in the drawing. Piston 13 may be moved to the right (to raise the cutting head) by hydraulic liquid under pressure at the single port 15 of the cylinder.

In this system the flow of hydraulic liquid to or from the cylinder port 15, which determines whether the load is to be raised or lowered, is under the control of a manually operable directional control valve 16.

In the particular embodiment illustrated, the directional control valve 16 is shown as an open-center valve of known design, comprising a housing 18 having an inlet port 19, a motor port 20 and a return port 21. The inlet port 19 is connected to the outlet side of a pump 22, which may be driven by the engine of the combine. The pump 22 pumps suitable hydraulic liquid, such as oil, from a reservoir or sump 23 on the combine. The motor port 20 is connected through a counter-balance valve 17 to the cylinder port 15. The return port 21 is connected through a return line 24 to the sump 23.

The housing 18 of the open-center valve is formed with a longitudinal bore 24, which slidably receives a reciprocable valve spool 25. The valve spool has three longitudinally spaced valve elements 26, 27 and 28 which are sealingly engageable with respective valve seats in the valve housing 18 at bore 24. The inlet port 19, motor port 20 and return port 21 communicate with bore 24 at longitudinally spaced locations along the bore.

In the neutral or centered position of the valve spool 25, as shown in the drawing, its middle valve element 27 permits liquid to flow from the inlet port 19 into bore 24 and thence to the motor port 20. In this position of the valve spool, its left-end valve element 26 permits liquid to flow from bore 24 to the return port 21. Therefore, it will be seen that in its neutral position the valve spool connects the inlet port 19 to both the motor port 20 and the return port 21.

When the valve spool is displaced to the right in the drawing, its middle valve element 27 sealingly engages the valve housing to the right of the inlet port 19 and its left-end valve element 26 sealingly engages the housing to the right of the return port 21. Therefore, in this position, which is its "raise" position, the valve spool connects the inlet port 19 to the motor port 20 and it blocks the return port 21 from both the inlet port and the motor port.

Conversely, when the valve spool is displaced to the left, its middle valve element 27 sealingly engages the valve housing to the left of the inlet port 19 and its left-end valve element 26 opens the return port 21. Accordingly, in this position, which is its "lower" position, the valve spool connects the return port 21 to the motor port 20 and it blocks the inlet port 19 from both the motor port and the return port.

The valve housing 18 also has an additional port 29 which intersects the bore 24 to the right of the inlet port 19.

To the right of port 29, a return passage 30 in the valve housing intersects the bore 24. Bore 24 is enlarged at 24a at this return passage 30, so that the portions of this passage above and below the bore are always in fluid communication with each other. This return passage extends from bore 24 to the return port 21.

Port 29 is in fluid communication with the inlet port 19, the motor port 20 and the return port 21 in the neutral position of the valve spool. In the "raise" position of the valve spool, port 29 is blocked from inlet port 19 and motor port 20 and is connected to return port 21 via return passage 30. In the "lower" position of the valve spool, the port 29 is in fluid communication with the inlet port 19 and it is blocked from both the motor port 20 and the return port 21.

In the neutral position of the valve spool, the return passage 30 is in fluid communication with the bore 24 and the inlet port 19, motor port 20 and port 29. In the "raise" position of the valve spool, the return passage 30 is in fluid communication with port 29, but is blocked from the inlet port 19 and the motor port 20. In the "lower" position of the valve spool, its valve element 28 sealingly engages the valve housing to the left of return passage 30 and blocks passage 30 from port 29, as well as from the inlet port 19 and the motor port 20.

Valve spool 25 carries O-rings 25a and 25b which sealingly engage the bore 24 beyond the return port 21 and the return passage 30, respectively.

A coil spring 31, engaged under compression between the right end of the valve housing 18 and the valve spool 25, biases the valve spool to the left in the drawing.

The left end of the valve spool 25 projects beyond the valve housing. In accordance with the present invention, the valve spool is engaged there by a movable modulating member, consisting of a pivoted arm 32 and an adjustment screw 33 threadedly mounted thereon and engaging the end of the valve spool. The pivoted arm 32 is mechanically coupled to the ground-engaging feelers 11, such as through a control cable 34 of known design.

When the ground-engaging feelers engage a bump or rise in the ground they cause the modulating member 32, 33 to pivot clockwise in the drawing, so as to force the valve spool 25 to the right, i.e., to its "raise" position. Conversely, when the ground-engaging feelers engage a depression in the ground the modulating member 32, 33 pivots counterclockwise in the drawing, permitting the valve spool 25 to move toward its "lower" position under the urging of spring 31.

The present invention also includes a manual override arrangement provided to enable the operator to raise the cutter head, regardless of the position of the ground-engaging feelers 11 and the modulating member 32, 33. In the particular embodiment illustrated this manual override includes a lever 35 pivotally mounted on the same axis 36 as the modulating member and having an integral lateral projection 37 for engagement with the left end of the valve spool. The lever 35 carries a spring-pressed detent 38 which engages the underside of a fixedly positioned member 39. Member 39 has an elongated arcuate slot 40 and, spaced therefrom, a notch 41.

In the vertical position of the lever 35, as shown, its detent 38 engages member 39 at the left end of slot 40. This is the neutral position of the lever, in which it blocks the valve spool 25 from movement to the left (i.e., to the "lower" position).

When lever 39 is moved clockwise from its neutral position, the detent 38 rides along slot 40 until it reaches the right end of this slot. This is the "raise" position of lever 35. In this position its projection 37 has moved to the right, forcing the valve spool 25 to its "raise" position, independent of the position of the modulating member 32, 33.

Conversely, when lever 35 is moved counterclockwise, its detent rides out of slot 40 and finally engages notch 41. This is the "automatic" position of lever 35, in which its projection 37 is retracted away from engagement with the valve spool 25, so that the latter's position is determined exclusively by the position of the modulating member 32, 33, which is operated automatically by the ground-engaging feelers 11.

The drawing shows a preferred embodiment of the counterbalance valve 17 in the present hydraulic system. However, it is to be understood that various other counterbalance valves may be substituted in its place, if desired.

Valve 17 has a first port 42 connected directly to the motor port 20 of the directional control valve 16, a second port 43 connected directly to the cylinder port 15, and a pilot pressure port 44 connected directly to the additional port 29 of the directional control valve 16.

In the particular embodiment illustrated, the housing of the counterbalance valve is formed with a bore 45 communicating with its first port 42, and a counterbore 46 extending coaxially from the inner end of bore 45 and communicating with the second port 43. A sleeve 47 is fixedly mounted in bore 45 and counterbore 46, presenting an annular external shoulder 48 which abuts against an internal shoulder 49 on the housing at the juncture between bore 45 and counterbore 46. Sleeve 47 carries an O-ring seal 50 engaging the housing bore 45. A plug 51 is threadedly received in the valve housing to the left of counterbore 46. This plug engages the left end of sleeve 47 and positions the sleeve axially as shown. An O-ring seal 52 is provided between the plug and the valve housing.

At its right end, sleeve 47 presents an axial passage 53 which is open to port 42. Sleeve 47 also is formed with a cylindrical axial chamber 54 of larger diameter than passage 53 and coaxial with the latter and intersecting the latter at an internal annular shoulder 55 on the sleeve. A plurality of circumferentially spaced, radial openings 56 in the sleeve provide fluid communicating between its chamber 54 and the valve housing counterbore 46.

A hollow outer valve member 57 is slidably disposed in the sleeve chamber 54. At its right end this valve member presents a frusto-conical surface 58 which normally sealingly engages the inside corner of the internal shoulder 55 on the sleeve at the juncture between the sleeve passage 53 and the sleeve chamber 54. Just to the left of this sealing surface 58, the outer valve member has an outer cylindrical surface 59 of smaller diameter than the sleeve chamber 54, so that an annular space is provided around the outer valve member at this location. This annular space communicates with the radial openings 56 in the sleeve. At its left end the outer valve member has a cylindrical portion with a sliding fit in the sleeve chamber 54.

The outer valve member 57 has an internal, axial, cylindrical chamber 60, which is open at its left end, and a plurality of circumferentially spaced, radial openings 61 providing fluid communication between this chamber 60 and the sleeve passages 56. At the right end of its chamber 60, the outer valve member 57 presents an internal annular shoulder 62. An elongated cylindrical modulating passage 63 in the outer valve member extends from this shoulder into the axial passage 53 in the sleeve.

The counterbalance valve also includes an inner valve member or poppet 64 having an axial passage 65 extending throughout its length. An oblique bore 66 extends from passage 65 to a location on the right end of the poppet which is always open to the sleeve passage 53.

Poppet 64 presents an enlarged annular shoulder 67 which normally abuts against the internal shoulder 62 on the outer valve member. To the right of its shoulder 67, the poppet presents a tapered nose 68 extending through the modulating passage 63 in the outer valve member. Nose 68 is sealingly engageable with the left end of passage 63 and has a progressively greater clearance therein to the right in the drawing.

Poppet 64 carries an O-ring 69 which sealingly engages a bore 70 in plug 51. By virtue of this O-ring seal and the longitudinal passage 65, 66, the poppet is partially pressure balanced.

A coil spring 71, engaged under compression between plug 51 and the enlarged shoulder 67 on the poppet, biases the poppet into sealing engagement with the valve seat constituted by the internal shoulder 62 on the outer valve member 57, and also biases the outer valve member into sealing engagement with the valve seat constituted by the inside corner of the internal shoulder 55 on sleeve 47.

Between the bore 45 and pilot passage 44 the housing of the counterbalance valve has a bore 71 which slidably receives a piston 72 carrying an O-ring 73. The piston has a reduced diameter nose 74 at its left end which projects into the passage 53 in sleeve 47.

In the operation of this counterbalance valve, when the valve spool 25 in the open-center valve is in its neutral position, as shown, the counterbalance valve port 42 and the pilot passage 44 are both connected through the open-center valve 16 to the return line 24 to the sump. Spring 71 and the fluid pressure at port 43 due to the load on piston 13 maintain the outer valve 47 and the poppet 64 seated against their respective seats, thereby preventing return flow from the cylinder port 15 through the counterbalance valve.

When the valve spool in the open-center is in its "raise" position, the resulting liquid pressure at the counterbalance valve port 42 unseats the outer valve member 57 to permit flow from the motor port 20 of the open-center valve through the counterbalance valve to the cylinder port 15. At this time, the pilot passage 44 in the counterbalance valve is still connected through the open-center valve to the return line 24.

When the valve spool in the open-center valve is in its "lower" position, the counterbalance valve port 42 is connected through the open-center valve to the return line 24. The pilot passage 44 in the counterbalance valve is connected to the pump through the open-center valve, and the liquid pressure on piston 72 forces the latter to the left to unseat the poppet 64 and permit return flow from cylinder port 15 in proportion to the pump pressure at pilot passage 44.

An adjustable relief valve 80 is connected between the counterbalance valve pilot passage 44 and a line 81 connected to the upper end of the return passage 30 in the open-center valve. This relief valve is normally closed. It opens when the pressure at pilot passage 44 exceeds a safe value, as pump 22 continues to pump fluid thereto in the "lower" position of valve spool 25. When relief valve 80 opens, the pump fluid can recirculate through line 81 to the upper portion of return passage 30, through the enlarged portion 24a of bore 24 around the spool land 28 and thence through the lower portion of passage 30 to the return port 21.

OPERATION

To summarize the operation of this system, when the manual control handle 35 is set in its neutral position, as shown, it normally positions the valve spool 25 of the open-center valve in its neutral position and positively prevents the valve spool from moving to the left (toward its "lower" position). With valve spool 25 in its neutral position the liquid being pumped by pump 22 is circulated through the open-center valve 16 from the inlet port 19 to the return port 20 and thence back to the sump via return line 24. The counterbalance valve 17 is closed, preventing return flow from the cylinder 14, so that the liquid trapped between the piston 13 and the counterbalance valve maintains sufficient pressure on the piston to sustain the load 12. Thus, in the neutral position, the pump is not required to run at a pressure high enough to support the load. Consequently, overheating of the hydraulic system is avoided and the power input to the pump is minimized.

Normally, the operator will set the control handle 35 in its "automatic" position, in which its detent 38 engages in notch 41 and its projection 37 is retracted away from the valve spool 25. This leaves the position of the valve spool 25 entirely under the control of the modulating member 32, 33, which is actuated by the ground-engaging feelers 11.

When these feelers engage a rise, the modulating member 32, 33 pivots clockwise, forcing the valve spool to its "raise" position. In this position, the pump output is connected to the motor port 20, and the fluid pressure at the counterbalance valve port 42 opens the outer valve member 57 in the latter to supply fluid to port 43 and thence to the cylinder port 15 to raise the load (i.e., the cutting head of the combine).

Conversely, when the feelers engage a depression in the ground, the modulating member 32, 33 pivots counter-clockwise, permitting the valve spool 25 to move to its "lower" position under the influence of spring 31. When this happens, the pump pressure is connected through the open-center valve 16 to the pilot passage 44 at the counterbalance valve 17. The pilot pressure forces piston 72 to the left, unseating the poppet 64 in the counterbalance valve to permit return flow from the cylinder port 15 through the counterbalance valve and then through open-center valve 16 to the return line to the sump. This return flow is at a rate determined by the pilot pressure at passage 44.

Whenever the operator wants to raise the load, he may do so by moving the control lever 35 clockwise to its "raise" position. When this is done, the projection 37 on this lever forces the valve spool 25 to the right to the "raise" position, irrespective of the position of the automatically controlled modulating member 32, 33.

It will be noted that the pump is required to operate under pressure only while the load is being raised or lowered. At other times (i.e., when the valve spool 25 is in its neutral position) there is no load on the pump.

FIGURE 2 shows a system which is essentially similar to the FIG. 1 system, except that it is connected to control the operation of a double-acting cylinder-and-piston instead of the single-acting cylinder-and-piston of FIG. 1. Corresponding elements of the FIG. 2 system are given the same reference numerals as in FIG. 1, but with a "prime" subscript added. The construction and operation of these elements is the same in FIG. 2 as in FIG. 1, and the description of them will not be repeated.

In the FIG. 2 system the relief valve 80 and line 81 are omitted as unnecessary. A fluid line 90, connected to the right end of the cylinder 14', is connected to the pilot pressure port 44' and to the port 29' in the directional control valve 16'. In the "lower" position of the valve spool 25', pump fluid passes from inlet port 19' to port 29' and thence through passage 90 into the right end of cylinder 14' to move piston 13' to the left. The pressure of this fluid is applied at pilot port 44' against piston 72' to hold the counterbalance valve open for return flow from the left end of cylinder 14'. In the "raise" position of valve spool 25', return fluid from the right end of cylinder 14' flows through passage 90 to port 29' and thence through return passage 30' to return port 21.

In other respects, the operation of the FIG. 2 system is the same as for the FIG. 1 system already described in detail.

While certain presently-preferred embodiments of this invention and a specific practical application of the invention have been described in detail and illustrated in the accompanying drawings, it is to be understood that the invention is susceptible of other embodiments, and may be used for other purposes, without departing from its spirit and scope. For example, the open-center directional control valve 16 may be replaced by a closed-center valve, such as in a system using a variable displacement pump (such as a piston pump), or it may be replaced by an even different manually operable directional control valve arrangement, if desired.

I claim:

1. A hydraulic system for controlling the height of a cutting head on a vehicle having ground-engaging feeler means, said system comprising:

a reservoir for hydraulic liquid;

a pump connected to said reservoir to pump liquid therefrom;

a hydraulic motor for raising and lowering said cutting head;

an open-center valve having an inlet port connected to the pump outlet, a motor port connected to said motor, a return port connected to the reservoir, an additional port, and a reciprocable valve spool positioned between said inlet, return, motor and additional ports and controlling the respective liquid flows between said ports, said valve spool having a neutral position in which it connects said inlet port to said return port, said valve spool having a "raise" position at one side of said neutral position in which it connects said inlet port to said motor port and blocks said return port from both said inlet port and said motor port and connects said additional port to said return port, said valve spool having a "lower" position at the opposite side of said neutral position in which it connects said motor port to said return port and blocks said inlet port from both said return and motor ports and connects said inlet port to said additional port, and spring means in said valve biasing said valve spool to its "lower" position;

a normally-closed counterbalance valve connected between said motor port and the hydraulic motor and preventing return flow from the motor in said neutral position of said reciprocable valve means, said counterbalance valve being responsive to liquid pressure at said motor port to open in said "raise" position of said reciprocable valve means, and a movable pressure-responsive member connected to said additional port and operable by liquid pressure thereat in said "lower" position of said reciprocable valve means to hold said counterbalance valve open for return flow from said motor to said motor port and thence to said return port at a rate proportional to the liquid pressure at said additional port acting on said movable pressure-responsive member;

a movable rigid modulating member operated by said ground-engaging feeler means and engaging said reciprocable valve means in opposition to said spring means, said modulating member being movable inwardly against the urging of said spring means to position said valve spool in its "raise" position and being movable outwardly to permit said spring means to position said valve spool in its "lower" position;

and a manual control member selectively engageable with said valve spool in opposition to said spring means to position said valve spool in its "raise" position independent of the position of said modulating member.

2. The system of claim 1, wherein there is provided manually releasable means for holding said manual control member retracted away from engagement with said valve spool.

3. The system of claim 2, wherein said manually releasable means includes means for selectively locking said manual control member in the path of movement of said valve spool toward its "lower" position to prevent movement of said valve spool to its "lower" position by said spring mean.

4. In a hydraulic system for selectively operating a fluid motor, the combination of:

a directional control valve having an inlet port for pressurized liquid, a return port, a motor port, reciprocable valve means positioned between said inlet, motor and return ports and controlling the respective fluid flows between said ports, said reciprocable valve means having a neutral position, said reciprocable valve means having a first operating position at one side of said neutral position in which it connects said inlet port to said motor port and blocks said return port from both said inlet and motor ports, said reciprocable valve means having a second operating position at the opposite side of said neutral position in which it connects said motor port to said return port and blocks said inlet port from both said motor and return ports, and spring means in said valve biasing said reciprocable valve means to said second operating position;

a movable rigid modulating member engaging said reciprocable valve means in opposition to said spring means, said modulating member being movable inwardly against the urging of said spring means to position said reciprocable valve means in its first operating position, said modulating member being movable outwardly to permit said spring means to position said reciprocable valve means in its second operating position;

manually operable control means engageable with said reciprocable valve means in opposition to said spring means and selectively movable inwardly to position said reciprocable valve means in its first operating position independent of the position of said modulating member;

and manually releasable means for holding said manually operable control means retracted away from engagement with said reciprocable valve means.

5. The combination of claim 4, wherein said manually releasable means includes means for positioning said manually operable control means blocking the movement of said reciprocable valve means to its second operating position under the urging of said spring means.

References Cited by the Examiner
UNITED STATES PATENTS

| | | | |
|---|---|---|---|
| 2,913,878 | 11/1959 | Rue | 56—20 X |
| 2,954,800 | 10/1960 | Searles et al. | 137—596.2 |
| 3,088,264 | 5/1963 | Sallee | 56—208 X |
| 3,163,974 | 1/1965 | Mack. | |

ABRAHAM G. STONE, *Primary Examiner.*

ANTONIO F. GUIDA, *Examiner.*